United States Patent [19]
Henderson et al.

[11] Patent Number: 5,203,199
[45] Date of Patent: Apr. 20, 1993

[54] CONTROLLED ACCELERATION PLATFORM

[75] Inventors: Frederick H. Henderson; Arthur R. Thorne; Hardin Joyce, Jr., all of Huntsville, Ala.

[73] Assignee: Teledyne Industries, Inc., Los Angeles, Calif.

[21] Appl. No.: 597,716

[22] Filed: Oct. 12, 1990

[51] Int. Cl.$^5$ .............................................. G01P 21/00
[52] U.S. Cl. ..................................................... 73/1 D
[58] Field of Search ............... 73/1 D, 1 DV, 2, 865.3

[56] References Cited

U.S. PATENT DOCUMENTS

| | | |
|---|---|---|
| 3,294,467 | 12/1966 | Rademakers . |
| 3,350,916 | 11/1967 | Bock . |
| 3,672,473 | 6/1972 | Verhagen . |
| 4,003,241 | 1/1977 | Thomas . |
| 4,158,956 | 6/1979 | Vadasz Fekete . |
| 4,166,406 | 9/1979 | Maughmer . |
| 4,220,044 | 9/1980 | LeBlanc et al. . |
| 4,576,034 | 3/1986 | Ferree et al. . |
| 4,869,092 | 9/1989 | Bernard et al. . |

FOREIGN PATENT DOCUMENTS

| | | |
|---|---|---|
| 1255934 | 12/1967 | Fed. Rep. of Germany . |
| 3050190 | 1/1983 | Fed. Rep. of Germany . |
| 0017441 | 1/1987 | Japan . |
| 0731383 | 4/1980 | U.S.S.R. . |
| 1142744 | 2/1985 | U.S.S.R. . |

OTHER PUBLICATIONS

Clark, "An Improved Method for Calibrating Reference Standard Accelerometers", Metrologia 19, 103–107 (1983).
Ingebritsen, "Methods for Calibrating Motion Measuring Transducers at Low Frequencies", Inst. Society of America, 22nd Annual ISA Conference and Exhibit, Sep. 11–14, 1967, Chicago, Ill.

*Primary Examiner*—Robert Raevis
*Attorney, Agent, or Firm*—Beveridge, DeGrandi, Weilacher & Young

[57] ABSTRACT

A controlled acceleration platform which provides a horizontally quiet platform capable of accurate acceleration and angular control. An object at or near the center of percussion of the pendulum assembly experiences reduced seismic and cultural ground vibration, and experiences negligible hysteresis and stiction for minute adjustment in inclination. By rigidly attaching the device to a single pivot or flexure so as to isolate the accelerometer from seismic or cultural vibration, the small tilt associated with pendulum motion at the proper radius from the flexure completely cancels the inertial term. The suspended item is also isolated from small error producing effects such as earth tide, local ground swell from solar heating, and far field gravity changes as produced by the sun and the moon. The lateral acceleration sensed by the suspended item may be adjusted by controlling tilt of the platform. This can be done by adding weight at a distance from the center line. With an accelerometer attached, the platform can also be used to measure very minute applications of force. The pendulus platform can be used to calibrate accelerometers through the addition or removal of weight at a distance from the center of gravity or by the relatively large lateral displacement of a small mass. A supporting platform for the pendulus platform is provided with either passive or active damping (or both). When damping of the supporting structure is used, this is not sensed by a horizontally mounted accelerometer under test as the damping takes place external to the pivot point of the pendulus platform and thus the accelerometer positioned at the center of percussion is not appreciably affected.

22 Claims, 9 Drawing Sheets

CONTROLLED ACCELERATION PLATFORM

FIELD OF THE INVENTION

A pendulous platform assembly particularly suited to create a quiet environment for the testing of accelerometers.

BACKGROUND OF THE INVENTION

Various attempts have been made in the prior art to mount instruments in a stabilized way such that oscillations of the supports for such instruments will not be transmitted to the instruments. For example, U.S. Pat. No. 3,294,467 illustrates a stabilization system for instruments sensitive to low natural oscillating frequencies. The invention described in U.S. Pat. No. 3,294,467 features a spherical container mounted on legs and filled with fluid. A rigid suspension bar extends from inside the top of the sphere to the center of the sphere and a flexible suspension wire extends down from the free end of the suspension bar to support a platform at its center. An instrument is positioned on the platform to one side of the suspension wire's connection point with the platform, and a dummy mass is positioned such that the center of gravity of the volumes supported by the platform coincide with a vertical line through the center of the platform.

U.S. Pat. No. 3,672,743 discloses a similar arrangement to that of U.S. Pat. No. 3,294,467 except for a modification in the contents of the fluid. The fluid material is modified to avoid variations in instrument readings caused by changes in the viscosity of the fluid.

Despite U.S. Pat. No. 3,672,743, instrument errors caused by variations in viscosity still remain a problem for high precision instruments. In addition, the arrangements disclosed in the two patents described above are prone to problems such as inability to control instrument errors due to wobble and rotation of the platform. Moreover, in attempting to achieve stabilization there is sacrificed the freedom of utilizing the platform for other functions such as calibration and dynamic testing of instruments susceptible to vibration noise in the surrounding environment. Still further, the stabilization systems presented in the above two patents are not well suited for use with the very high precision instruments presently available, especially those designed for use in space.

Various other prior art devices have been proposed for providing a stable platform for instruments such as accelerometers. It has been known to suspend platforms by parallel wires, for example, a rectangular platform has been suspended by four cables with one cable connected at each corner, the cables extending vertically from the connection point, such arrangements have not achieved much success A major factor underlying the lack of success for such prior art embodiments is that acceleration reduction is limited by the inverse square root of the pendulum height. Damping has also proved difficult, and bounce modes have severely affected performance. Such suspended platforms are also prone to error producing effects such as earth tide, and far field gravity changes as produced by the sun and moon. The parallel wire suspension of a platform is also highly susceptible to errors caused by inadvertent horizontal forces which develop during testing procedures (e.g., input drives) and are directly picked up as lateral acceleration by the instrument positioned on the platform.

SUMMARY OF THE INVENTION

The present invention provides a pendulous assembly particularly suited for the evaluation of accelerometers or other acceleration sensitive devices while avoiding the problems associated with the prior art systems The present invention provides a horizontally quiet platform capable of accurate acceleration control either for testing and/or calibration purposes or for providing a suitable support surface for instruments actually in use. The present invention is implemented such that an object at the center of percussion of the assembly's pendulous platform experiences reduced seismic and cultural ground vibration. The pendulous platform of the present invention reduces hysteresis and stiction to negligible levels, even for minute adjustments in the inclination of the platform By supporting the device to be isolated from seismic or cultural vibrations on a platform depending from a single pivot or flexure, small tilts associated with pendulous motion at the proper radius from the flexure completely cancels the inertial term. Unlike in the prior art arrangement, the suspended object or instrument is also isolated from small error affects such as earth tide, and far field gravity affects produced by the sun and moon.

In achieving the above described advantages over the prior art, one embodiment of the present invention features a single pivot pendulous platform supported by a plurality of suspension lines which converge to essentially a single pivot point. The single pivot point is suspended by a suitable support structure so as to enable the platform to oscillate in pendulous fashion.

In a preferred embodiment, the suspension lines converge and are connected to pivot means such as a flexure member which provides the pivot location for the pendulous platform. The invention also contemplates the replacement of the flexure member as the pivot means with alternate means such as additional mechanical pivoting means (e.g., a lubricated ball and socket arrangement), an air bearing arrangement, an eddy-current bearing arrangement or a fluid bearing assembly.

The frequencies or "vibration noise" which naturally occur in an earth environment where accelerometers are tested often exceeds 30 $\mu g$'s. It is estimated that the pendulous platform alone, with single pivot point connection, will reduce the natural frequency oscillations sensed by the accelerometer from the 30 or more $\mu g$'s noted above down to 4 to 5 $\mu g$'s. By regulating the height and swing of the pendulous platform, an accelerometer being tested with the present invention can be provided with very accurate input acceleration levels for calibration and dynamic response evaluation. One embodiment of the invention which provides very accurate input acceleration levels features a single pivot primary pendulous platform as described above with a cylindrical shaped platform. The platform suspending means is preferably in the form of suspension lines which are attached near or at the periphery of the platform and converge to the pivot means above The suspension lines are preferably rigid so as to form the pendulous platform and suspension means as essentially a rigid structure with respect to the pivot means. The present invention also contemplates other forms of suspending. means such as a conical shaped member attached to the platform at its base and to the pivot means at its apex. An important factor is that the platform is forced to rotate with rotation of the principle Z axis of the platform (i.e., the axis extending perpendicular to the upper planar surface of the platform). A recess formed in the central region of the platform receives therein a secondary platform. The secondary platform supports the instrument or instruments under test. A plurality of adjustment screws extend through the secondary platform and into contact with the lower region of the primary platform's recess By rotating the screws, the secondary platform can be either raised above the center of percussion of the assembly or positioned below the center of percussion of the assembly. Preferably, piezoelectric heads are positioned at the ends of the screws to allow for precise positioning of the secondary platform to a desired location. The positioning of the accelerometer under test a specific distance either above or below the center of percussion provides a predetermined gravitational input which should be sensed by the accelerometer if the accelerometer is functioning properly The component of the primary pendulum acceleration which should be sensed by the accelerometer is calculated in a conventional way using equations for pendulum motion. The screws extending through the secondary platform can be manually adjusted or driven by a micrometer motor to achieve a rough approximation of the desired height of the secondary platform. The piezoelectric heads thereafter are controlled by an applied electric current to fine tune the position of the platform.

In another embodiment of the invention, controlled acceleration input is achieved by a magnetic drive assembly The magnetic drive assembly is well suited for accelerometer testing as it avoids the stiction problem associated with other input drives, while also isolating the platform from ground frequency noise. The magnetic drive assembly preferably includes a box-like housing positioned below the platform. The box includes a pair of coils between which extends a permeable core which is attached at its end to the underlying surface of the platform. Alternatively, the permeable core can extend upwardly from an underlying ground surface and the coils can be supported in a box fixed to the undersurface of the platform. Either a single magnetic drive can be relied upon or a plurality of magnetic drives may be utilized to achieve the controlled acceleration input to the platform. For example, the use of two magnetic drive assemblies positioned diametrically opposed from one another underneath the cylindrical shaped platform would be suitable for the purposes of the present invention. By varying the electrical input to the coils, a large number of different pendulum frequencies can be attained for the pendulous platform Preferably a voice coil type magnetic drive is utilized.

In addition to using the magnetic drive assembly or assemblies to vertically manipulate the platform for achieving fine platform angle control, the magnetic assemblies can be utilized in a radial or tangential fashion to achieve horizontal control. Moreover, the magnetic assemblies can be used for achieving active damping of the platform For example, transducers, optical sensors, or photoelectric sensors can be used to monitor the tilt of the platform and to input signals to the magnetic assembly for controlled damping.

An alternate embodiment of the invention includes a controlled acceleration input device which is in the form of a fourier term input generator. As explained in greater detail below, such a generator is particularly useful in sensing "bias error" in an accelerometer under test. The fourier term generator in accordance with the present invention features a plurality of offset spinning masses supported within a housing positioned on the pendulous platform. The use of a plurality of offset spinning masses is particularly suited for the creation of suitable oscillatory driving. In one embodiment, the rectification drive utilizes a pair of counter rotating offset masses such that a symmetrical drive at variable motor frequencies is possible. The counter rotating offset masses are driven by a single drive with the counter rotating offset masses either mechanically or electrically locked. The interlocking of multiple rotating offset masses provides a means for fourier generation of non-sinusoidal functions. In a preferred embodiment, the single offset mass driving means is connected to the offset masses in a fashion which avoids slipping such that the offset masses rotate symmetrically with one another. For the purposes of this invention, however, a pseudo random or non-symmetrical driving relationship is contemplated. Thus, pulleys or belts can be used to interconnect the single driving means with the plurality of offset spinning masses despite the tendency for some of the belts or pulleys to slip and introduce non-symmetrical rotation. The Fourier term input generator can be easily adjusted in amplitude and phase so as to provide a wide latitude of frequency inputs. For example, the fourier input generator can be used to create a 1 Hz sinusoidal input as well as inputs of much higher frequency (e.g., 54 Hz). In addition, the ability to rotate the offset masses in a pseudo random fashion enables variation in the shape of the input function from one that is sinusoidal to one that is non-sinusoidal at least for the first two to three fourier terms. In this way, different vibrational inputs corresponding to different anticipated environments can be easily approximated by the fourier term input generator during testing of an accelerometer.

The ability of the Fourier term input generator to achieve a wide latitude of frequency inputs also makes it well suited for introducing a high input for determining the saturation point of an accelerometer. The fourier term generator also allows for a determination into whether there is any change in the average signal following the introduction of a balanced high frequency input.

The pivoting means of the pendulous platform can be supported by any suitable surface structure such as the ceiling of a room, the ceiling of a space vehicle, or a specially designed supporting structure. The present invention includes a supporting structure for the pendulous platform which is highly effective in preventing the translation of ground vibrational noise to vertical and horizontal accelerations which would be sensed by an accelerometer. The structure features a tripod arrangement wherein the three tripod legs are spaced around the platform and converge to a point just above the pivot point of the pendulous platform assembly. Thus, any vibrations transferred from the ground will be isolated to a single axis which simplifies sensing and damping of noise which otherwise would be transferred from the ground to the accelerometer.

In yet another embodiment of the present invention, external structure suspension means is positioned between the base of each of the tripod legs and the underlying support surface. As the suspension system is external to the flexure point, the accelerometer, which is positioned at or near the center of percussion of the pendulum, does not sense the suspension activity. In other words, the forces which develop in the suspension system pass through to the pivot point of the pendulous platform and thus are essentially incapable of influencing the horizontal axis(es) of an accelerometer positioned at the center of percussion of the pendulous platform. Thus, rather than relying upon direct damping between the platform and the environment itself, which is more susceptible to vibrations that can be sensed by accelerometers, the suspension of the present invention is capable of damping the system while essentially isolating the accelerometer from such activity.

The tripod support arrangement of the present invention with the external structure suspension means positioned between the base of the tripod legs and the support surface not only has the effect of reducing vertical vibration according to the spring equation, but also reduces bending of the platform structure which would result in accelerometer noise due to local changes in platform attitude and acceleration.

The invention contemplates the use of various active or passive suspension systems which can include spring means in combination with damping means. In a preferred embodiment, toroidal shaped air filled tubes (e.g., an inner tube) are positioned below a disk platform attached to the base of the tripod legs. The introduction of such an external and unsensed damping of the platform provides the capability of reducing the environmental acceleration sensed by the accelerometer from a value of 4 to 5 $\mu g$'s, as discussed for the pendulum platform to less than 1 $\mu g$.

Another aspect of the invention includes the positioning of a passive damping member such as an elastic block between the pendulum supporting structure (e.g., ceiling of room) and the pivot means. Thus, the pendulous platform is attached at its pivot means to the lower end of the passive damping structure and the passive damping structure is connected at its upper end to the support structure. As such a damping structure is external to the pivot means of the pendulous platform, it too provides a damping system which is not sensed in the horizontal plane of the pendulous platform. The passive damping member can be used either alone or in conjunction with the aforementioned tripod arrangement with the suspension or damping system positioned below the base of the tripod legs.

The invention also contemplates the use of an active horizontal attenuation system to achieve a damping function which is essentially unsensed by the accelerometer on the platform. In this arrangement a secondary support member would be positioned between the above pendulum support structure and the pivot means (e.g., flexure) for the pendulous platform. To achieve active horizontal attenuation one or more actuators is positioned on a horizontal plane and is in communication with the secondary support member. One or more optical transducers, or similar sensor devices, provide signals which correspond with the movement of the platform. The signals are received by a microprocessor or similar device for processing signals. Thereafter, the microprocessor forwards "lagging" signals, based upon the original platform movement signals, to the active input devices which cause the secondary support member to shift in lagging fashion, in the direction of pendulum movement. Again, such movement of the pivot means in combination with the swing of the pendulous platform causes damping of oscillation. The actuators can be magnetic, pneumatic, or any other suitable driving device which is capable of moving the secondary platform in lagging fashion with respect to the pendulum's movement. Rather than optical measuring devices, accelerometers or strain gauges or any other suitable transducer can be used to monitor the movement of the platform and relay the appropriate signals to the actuators such that the secondary platform follows the movement of the pendulum.

The use of an active damping system as opposed to a passive system provides greater control of damping and greater assurance that error producing rotation forces will not be imparted to the platform.

The present invention also includes an embodiment wherein an active vertical damping or attenuation system is positioned between the pivot means and the pendulum support structure. The active vertical attenuation system includes sensors which sense vertical vibrations either through the use of optical sensing means or a strategically located accelerometer or a strain gauge. Once sensed, the signal is forwarded to the vertical actuator such that the pendulum support moves with the pendulum, minimizing the vibration passed to the platform.

Another structure utilized by the present invention to provide accurate input acceleration levels for calibration and dynamic response evaluations includes an undamped secondary pendulum drive which inputs a known frequency to the primary pendulous platform. The secondary pendulum drive features a known mass extending from a tether line attached to the undersurface of the pendulous platform. Alternatively, a secondary pendulum attached to the primary platform by a knife edge or flexure can be employed. Increasing the flexure stiffness enables the secondary pendulum to operate at higher frequencies. The pendulum can be set in motion either manually or, in a preferred embodiment which avoids the introduction of unwanted lateral forces, through use of a linear motor. The pendulum linear motor would impart a sufficient force to place the secondary pendulum in harmonic motion. The undamped secondary pendulum described above is particularly suited for generating low frequency inputs used in a rectification test of an accelerometer.

The calibration of an accelerometer can be achieved by the addition of weights at a known distance from the center of mass. The weights must be added at a very precise distance along the sensitive axis of the accelerometer as any error in the positioning of the weight results in calibration error. It is also a time consuming task to determine the true accelerometer axis and maintain a perpendicular placement of weights on the platform. The present invention includes another embodiment which avoids the difficulties associated with placing the weight at a precise distance along the sensitive axis of an accelerometer through use of a damped secondary pendulum weight tray. The pendulum weight tray features a weight holder extending below the platform from a predetermined location on the platform. The secondary pendulum allows weights to be placed with less precision as the downward force of the weight is transferred from the tether line to a fixed location on the pendulum platform. The tether line is connected to the pendulum platform by pivot means and damping means is provided on the platform to prevent the build up of secondary pendulum oscillations. The damping of the natural frequency of the secondary pendulum can be achieved by any active or passive technique but the use of simple viscous damping caused by partial emersion in a fluid is sufficient for present applications.

An alternate embodiment of the present invention features an undamped secondary calibration weight tray which features a weight platform supported by a tether line connected to the pendulous platform in the manner described for the above embodiment. Alternatively, the calibration weight tray can include an upper knife edge extension supported on the upper surface of the pendulum. The point of the knife edge would be placed at a predetermined spot which is a known distance from the center of percussion and precisely along the sensitive axis of the accelerometer.

As a single knife edge point could introduce nondesirable lateral point of force application uncertainty, a preferred embodiment of the knife edge arrangement features two longitudinally spaced knife edges which are joined to a vertical member having means for supporting the calibration weights. The double knife edge results in the application of force at a point on the platform rather than any point along a line, independent of weight placement location on the tray. At the lower end of the vertical member is rigidly fixed a single knife edge bar extending horizontally below the platform. A C-shaped weight tray rests on the sharp upper edge of the horizontal knife bar. Hence, there is avoided the concern of having the weight mispositioned on the weight tray such that one of the knife edges is more heavily weighted than the other of the upper knife edges which could cause an unwanted tilting along an axis other than the accelerometer's sensitive axis. In other words, by placing the C-shaped weight tray along the horizontal knife bar which extends mid-way between the upper two knife edges and below the upper two knife edges, all the force produced by the added mass is directed to the horizontal knife edge bar and thus is equally applied between the upper two knife edges.

The present invention also utilizes either damping or driving means for damping or driving the knife edge weight assembly.

In still another embodiment of the present invention, a paddle extends downwardly from below the primary platform and is received within a container containing damping fluid (e.g., glycerin) and supported by an underlying surface. The reservoir is connected to a fill/drain pump such that the degree of damping can be controlled by changing the fluid level in the reservoir.

BRIEF DESCRIPTION OF THE PREFERRED EMBODIMENTS

Embodiments of the invention will now be described by way of example with reference to the accompanying drawings, in which.

DETAILED DESCRIPTION OF THE PREFERRED EMBODIMENTS

Figure 1:
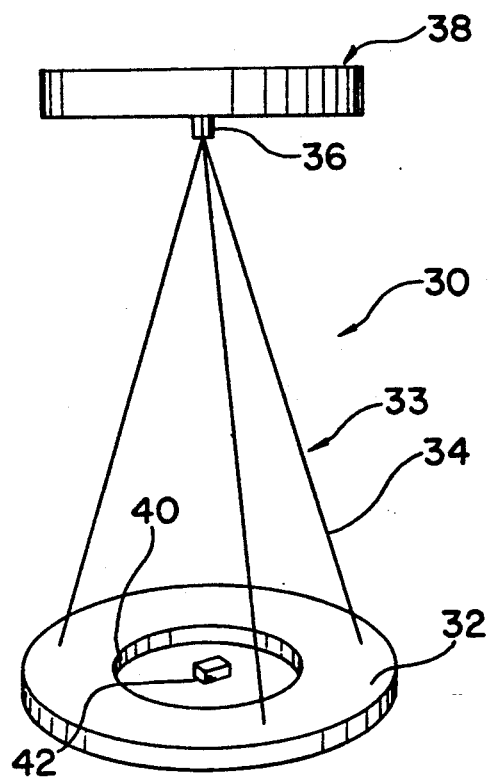
FIG. 1 shows a perspective and somewhat schematic view of the pendulous assembly of the present invention.

FIG. 1 shows in perspective view pendulous assembly 30 having primary pendulous platform 32 which is supported by suspending means 33 which in a preferred embodiment comprises a plurality of suspension lines 34. Suspension lines 34 converge towards one another and connect with pivot means 36. Support structure 38 is connected to pivot means 36 so as to support primary pendulous platform 32. As shown in FIG. 1, primary pendulous platform 32 is cylindrical in shape and has a central recess 40 formed therein. Positioned within recess 40 is an accelerometer 42 or any other desired instrument which senses acceleration or applied forces. Recess 40 enables accelerometer 42 to be more easily positioned at the center of percussion of the pendulous assembly 30. In a preferred embodiment, three suspension lines 34 are used with each suspension line being connected to the periphery of the cylindrically shaped primary pendulous platform 32 and extending to a single pivot means 36 which provides essentially a single pivot point about which primary pendulous platform 32 swings.

Figure 2:
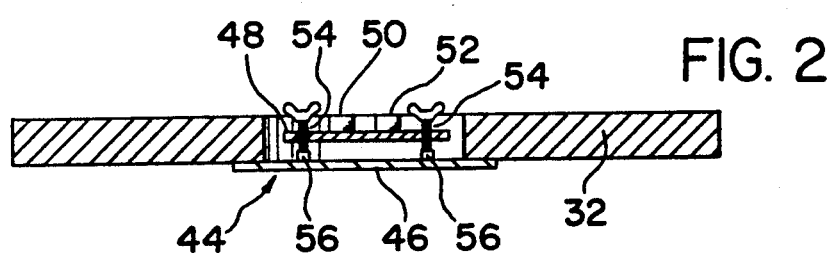
FIG. 2 shows a cross-sectional view of the primary pendulous platform shown in FIG. 1 together with an additional secondary platform.
Figure 3:
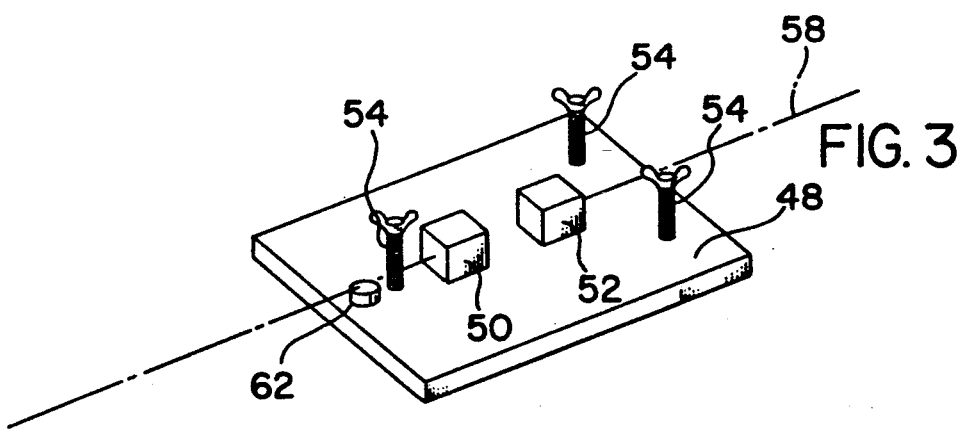
FIG. 3 shows in perspective the secondary platform shown in cross-section in FIG. 2.

FIG. 2 shows primary pendulous platform 32 in cross-section together with accelerometer height adjustment means 44. Accelerometer height adjustment means 44 includes a bottom plate 46 forming the bottom of recess 40. Also within recess 40 is secondary platform 48 which supports accelerometers 50 and 52. Extending through the secondary platform 48 are a plurality of adjustment screws 54. At the lower end of each adjustment screws 54 is positioned a piezoelectric head together with the appropriate wiring (not shown). Piezoelectric heads 56 are in contact with the upper surface of bottom plate 46. The piezoelectric heads are retained within a depression formed in the bottom plate so as to avoid sliding of secondary platform 48. The depression is preferably a detent formed of a hard material which is not easily subject to wear. Adjustment screws 54 allow for accelerometers 50 and 52 to be raised and lowered such that the accelerometers can be positioned at the center of percussion, above the center of percussion, or below the center of percussion of pendulous assembly 30. FIG. 3 illustrates secondary platform 48 in perspective view. As shown in FIG. 3, accelerometers 50 and 52 are arranged essentially in linear fashion on the upper surface of secondary platform 48 such that each of the accelerometer's sensitive axis falls essentially along the same line 58. Preferably, the accelerometers 50, 52 will be oriented with respect to one another to provide output signals of opposite polarity in response to acceleration of the primary platform 32.

Figure 4:
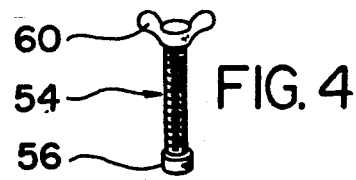
FIG. 4 shows one of the adjustment screws illustrated in FIG. 3.

FIGS. 3 and 4 show in greater detail adjustment screws 54. FIG. 4 illustrates the manual turning flange 60 provided at the upper end of adjustment screws 54 as well as piezoelectric head 56. By manually turning one or more of adjustment screws 54, the platform can be raised and/or tilted to a desired position. Adjustment screws 54 in combination with fluid level 62 allow for rough adjustments of secondary platform 48 to predetermined positions. Finer adjustments of secondary platform 48 can then be made by controlling the electrical input to piezoelectric heads 56. Thus, accelerometers 50 and 52 can be placed at the same height and an equal horizontal distance away from the center of percussion of the entire pendulous assembly 30. Rather than relying on manual rough adjustment, it is contemplated that a micrometer motor (not shown) can be used to vary the position of screws 54.

Furthermore, the ability to adjust secondary platform 48 to positions above and below the center percussion of pendulous assembly 30 provides a means for applying a known oscillating gravitational component which can be used to test the accelerometer. In other words, movement of the accelerometer away from the center of percussion will result in the accelerometer sensing some portion of intentional oscillation of the pendulous assembly 30. The value calculated for the gravitational force sensed by the accelerometer positioned above or below the center percussion can then be compared with the actual output readings of the accelerometers to determine if the accelerometers are in proper working condition at very low dynamic input levels (e.g., 0.5 Hz with a magnitude measured in nano-g's).

Figure 5:
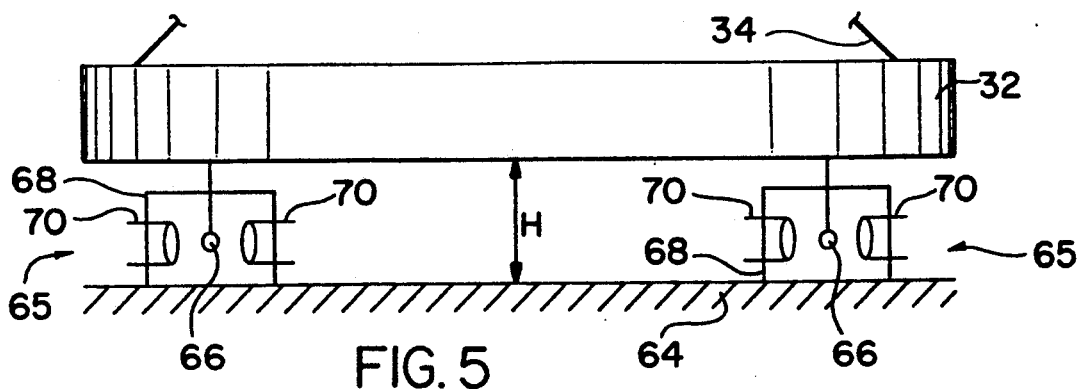
FIG. 5 shows an elevational view of the primary pendulous platform together with a pair of magnetic drive assemblies positioned therebelow.

FIG. 5 illustrates an alternate manner of providing a known input to pendulous assembly 30. As illustrated in FIG. 5, primary pendulous platform 32, supported by suspension lines 34, is positioned a height H above underlying support 64 and magnetic drive assemblies 65 are supported by underlying support 65. Extending downwardly from the undersurface of primary pendulous platform 32 are permeable cores 66. Permeable cores 66 extend into a respective one of the two floor mounted boxes 68 positioned below platform 32. Magnetic drive assemblies 65 further include a pair of coils 70 positioned within each floor mounted box 68 such that permeable cores 66 extend between the coils of each pair.

Figure 6:
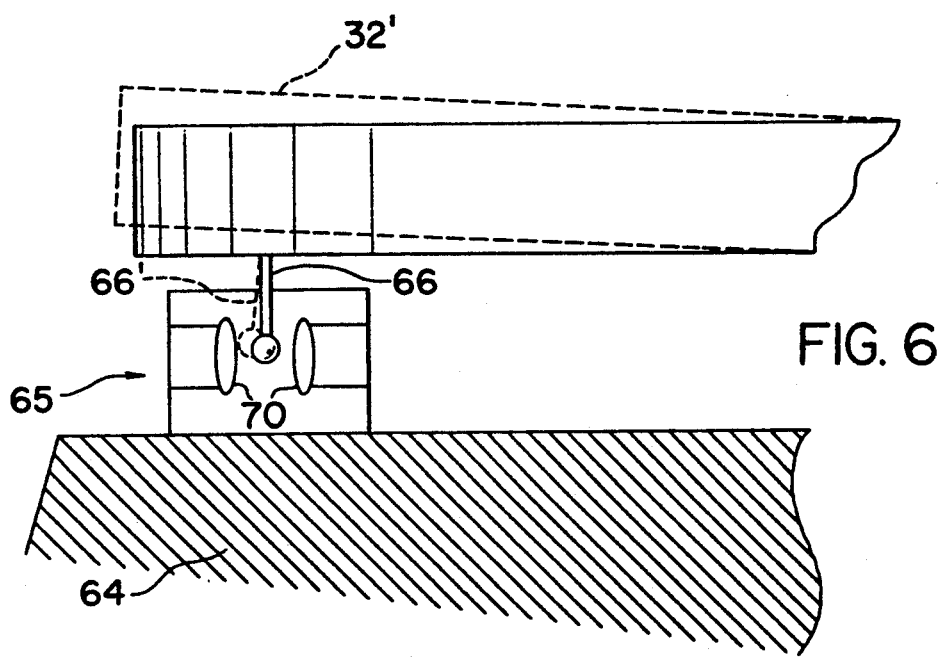
FIG. 6 shows in greater detail one of the magnetic drive assemblies and in dash lines the platform tilted slightly upwardly.

FIG. 6 shows in greater detail magnetic drive assembly 65 and primary pendulous platform 32 positioned thereabove. FIG. 6 further illustrates the ability of magnetic drive assembly 65 to incline pendulous platform 32 to a predetermined level by regulating the electrical energy inputted to coil 70. As shown in dash lines in FIG. 6, the variation in electrical energy applied to coil 70 results in permeable core 66 being attracted closer to one coil than to the other. The movement of permeable core 66 to the position shown in dash lines in FIG. 6 causes a slight and predeterminable inclination in pendulous platform 32.

Figure 7:
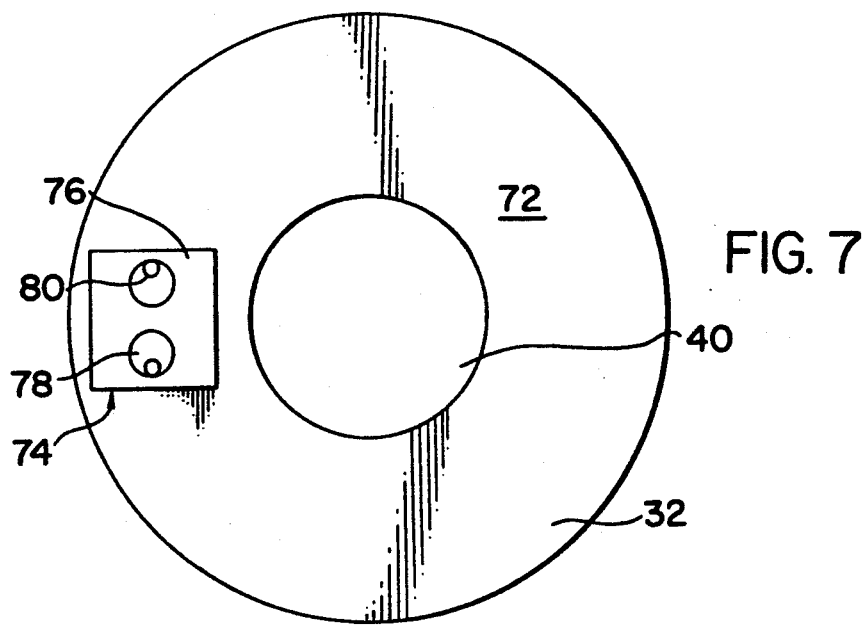
FIG. 7 shows a fourier term input generator resting on the upper surface of the primary pendulous platform.

FIG. 7 illustrates, in planar view, primary pendulous platform 32 having recess 40 formed therein. On the upper surface 72 of primary pendulous platform 32 is positioned sinusoidal input generator 74. Sinusoidal term input generator 74 includes casing 76 which rests upon or is fixed to upper surface 72. Sinusoidal term input generator 74 includes spinning offset mass assemblies 78 and 80. As illustrated in FIG. 7, spinning offset masses 78 and 80 are in a symmetrical rotation with one another to vibrate the platform 32 at selected frequencies. The use of equal counter rotating offset masses results in sinusoidal input only in the platform radial direction.

Figure 8:
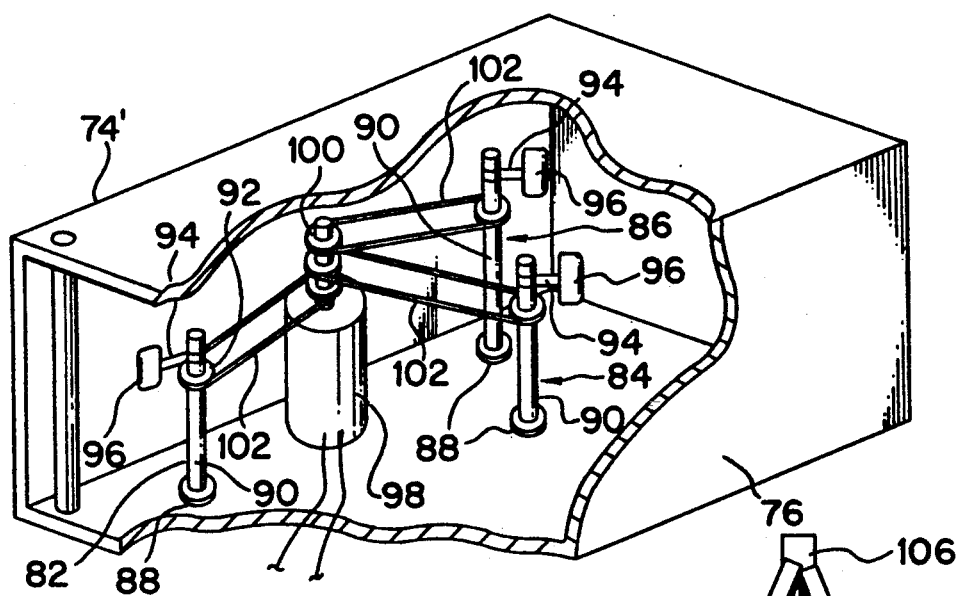
FIG. 8 shows in cut-away a fourier term generator having three offset driven masses.

FIG. 8 illustrates a modified embodiment of a Fourier term input generator which has been designated 74'. The modified input generator 74' features three spinning offset mass assemblies 82, 84 and 86. Each of the offset spinning masses 82, 84 and 86 includes an underlying bearing support 88 which receives pivot rod 90. Pivot rod 90 includes fixed pulley wheel 92 and an extension arm 94 which extends away from pivot rod 90 and is secured to mass 96. Positioned adjacent each of the offset spinning mass assemblies 82, 84 and 86 is driving means 98 which preferably is an electric motor. Driving means 98 includes drive shaft 00 with attached pulley wheels. Driving belts 102 extend between the pulley wheels on the drive shaft 100 and the fixed pulley wheel pivot rods 90. By adjusting the amplitude and frequency of the electric motor, it is possible to vary the driving frequency applied to the underlying platform 32. By varying the relative offsets of the masses and the phase of position, it is possible to produce the first three Fourier terms of any periodic input function. Drive belts 102 are preferably elastic in nature and thus are subjected to a certain degree of slippage which produces a quasi-random frequency generation in the input generator 74'. Alternatively, to achieve fixed input wave shapes such as ramp or sawtooth waveforms, high tolerance gear chains, gearing or electrical locking means can be used to create a symmetric rotation of the offset masses.

Figure 9:
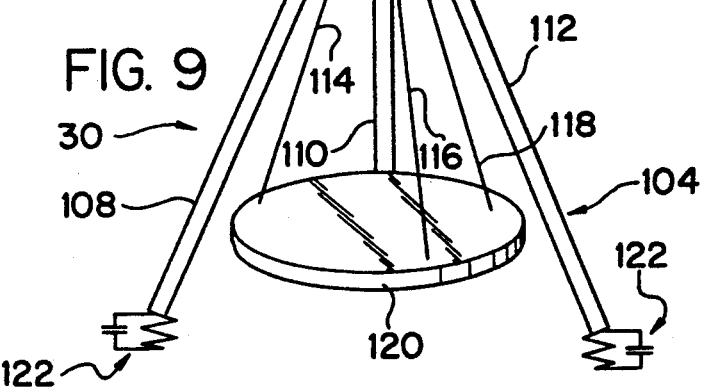
FIG. 9 shows in perspective a particular supporting structure for supporting the pendulous assembly.

FIG. 9 illustrates a perspective view of pendulous assembly 30 having an advantageously designed supporting structure 104 which is in the form of a tripod.

Supporting structure 104 includes an apex region 106 which represents the area where tripod legs 108, 110 and 112 converge together in a secured relationship. At a position below apex 106, pivot means 36 is connected with suspension lines 114, 116 and 118 which are preferably formed of INVAR rods, as rods of such material are highly resistant to variating in length due to thermal inputs. Suspension lines 114, 116 and 118 are connected along or near the periphery of primary platform 120. At the base of each of tripod legs 108, 110 and 112 is positioned a suspension system 122. As illustrated in FIG. 9, suspension systems 122 feature a spring element and a damping element In an alternate embodiment, as explained in greater detail below, the external structure suspension means 122 can be replaced with an air bag suspension system. Suspension means 122 act to attenuate ground vibrations which could create uncontrolled vibration noise of an accelerometer being tested on the platform Moreover, the tripod arrangement of supporting structure 104 transfers any vibrations not damped to a location which is external to pivot means 36 such that the vibrations have reduced effect on the accelerometer which is positioned at or near the center of percussion of the pendulous platform Furthermore, the tripod arrangement acts to channel any resultant vibrations along a single axis which makes further compensation easier.

Figure 10:
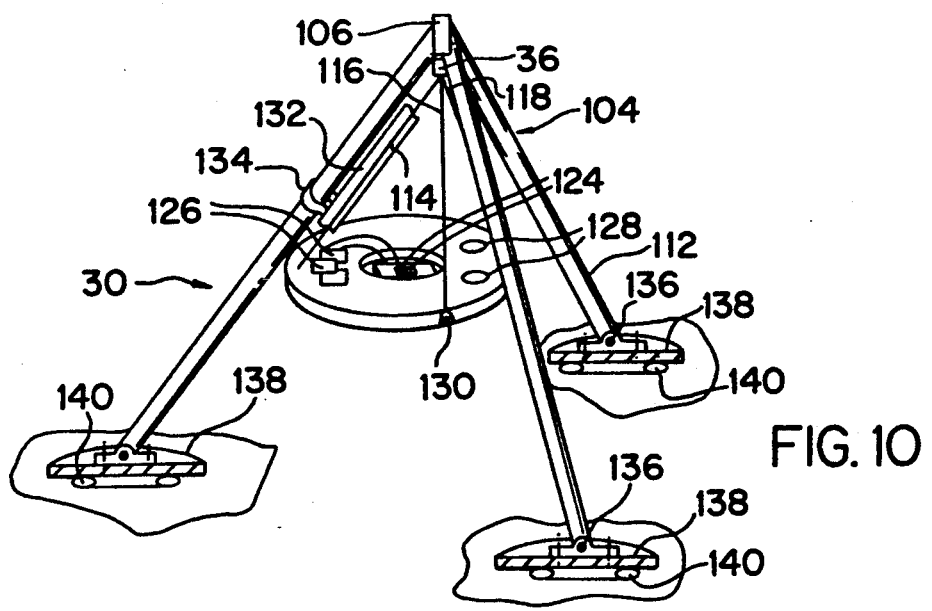
FIG. 10 shows in perspective and partially cut-away, a support structure of FIG. 9 in greater detail.

FIG. 10 shows in greater detail that which is shown somewhat schematically in FIG. 9 except in the embodiment of FIG. 10 an air bag is used as the suspension means. In FIG. 10, supporting structure 104 with tripod legs 108, 110 and 112 extend above primary pendulous platform 32. The pivot means 36 which is connected below apex 106 and secured to the suspension lines 114, 116 and 118 is shown to be in the form of a flexure member which is illustrated in greater detail in FIG. 27. Primary pendulous platform 32 contains within its recess 40 one or more accelerometers 124 positioned at or near the center of percussion for the entire pendulous assembly 30. Positioned on primary platform 32 are a plurality of batteries 126 which are offset by known masses 128 positioned diametrically opposite battery 126. For critical tests these batteries provide back up power to primary outside power wires extending over the platform.

As shown in FIG. 10, suspension lines 114, 116 and 118 are connected to the outer periphery of platform 32 in a manner which allows three degrees of rotational freedom. Tripod legs 108 are preferably formed of a high strength material such as stainless steel while the pendulous platform 32 can be formed of an aluminum alloy. Each of the suspension lines can be covered with a covering (only one shown) 132 or a similar covering capable of shunting magnetic fields which could provide torque induced error via the suspension lines 114, 116 and 118. Furthermore, these shield the suspension lines from air drafts and air carried thermal changes. Conventional mu metal coverings 132 are supported by mu metal covering holders 134 which are attached to the tripod legs 108 by horse shoe shaped clips, preferably formed of copper, so as to provide some latitude in shield placement to avoid shield contact with the suspension lines.

Each of the tripod legs includes a base region which preferably features a single axis pivot shoe 136. Positioned below shoe 136 is a disk platform 138 which abuts an underlying damping member 140 which, in a preferred embodiment, is a toroidal shaped air bag. The air bag is placed over the underlying supporting surface such as the floor of a room. The air bags 140 positioned below the disk platform 138 provide a simple spring and damper system to attenuate ground vibrations passing through to the supporting structure 104. In addition the compliance of the air bag 140, which occurs in lagging fashion behind the swinging moving of the pendulous platform 32, helps dampen natural periodic rotation in the assembly.

Figure 11:
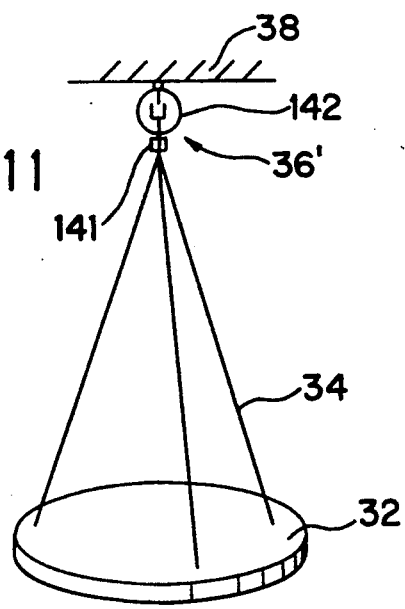
FIG. 11 shows the pendulous assembly of FIG. 1 together with a passive vertical attenuation means.

FIG. 11 illustrates primary pendulous platform 32 supported by a plurality (e.g., 3) of suspension lines 34 which converge and connect with a pivot means 36'. Pivot means 36' comprises a pivot member 141 and between the pivot member and support structure 38 is positioned a passive vertical damping means 142 which helps dampen any vibrations travelling through support structure 38. Passive vertical attenuation means 142 also tends to dampen any bouncing forces which might be transferred to the pendulous platform so as to create an error in the accelerometer's output. Passive vertical attenuation means 142 can be an elastomeric block or air bag or any other suitable damping means. Passive vertical attenuation means 142 is especially useful in conjunction with the previously described tripod support structure having a suspension means positioned between the base of the tripod legs and the underlying surface. The reason being, that the vibrations travelling along the tripod legs will be channelled through the single axis at the tripod apex and thus the passive vertical attenuation means 142 is in proper alignment for achieving its dampening function.

Figure 12:
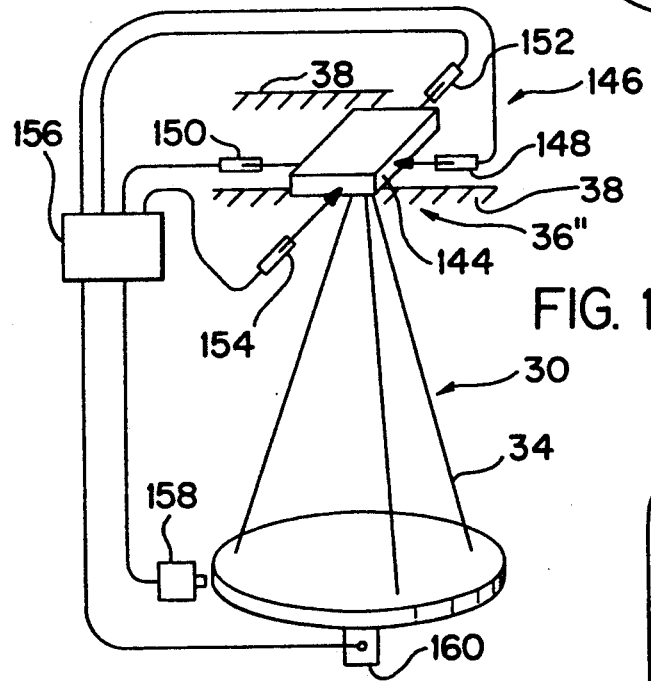
FIG. 12 shows the pendulous assembly of FIG. 1 together with an active horizontal attenuation system.

FIG. 12 illustrates an alternate embodiment of the present invention wherein pendulous assembly 30 includes primary platform 32 and suspension lines 34 which converge to connect with pivot means 36". Pivot means 36" comprises a secondary support structure 144 which forms part of active horizontal attenuation system 146. Secondary support structure 144 is free to slide along a horizontal plane and is supported above or below by support structure 38. Secondary support structure 144 can take any form which allows for horizontal movement of secondary support structure 144 with respect to support structure 38 while avoiding high stiction levels. For example, secondary support structure 144 can slide along a fluid air bearing surface or a fluid lubricant. Alternatively, secondary support structure 144 and/or primary support structure 38 can include a low friction bearing surface (e.g., Teflon (TM)) or a set of flexures arranged to maintain the horizontal orientation.

Active horizontal attenuation system 146 features a plurality of actuators 148, 150, 152 and 154. Actuators 148, 150, 152 and 154 preferably are arranged along axes lying on a horizontal plane above pivot means 36. The actuators can take any form such as a forced air device, an electromagnet device, a similar functioning device or piezoelectric elements. The actuators receive electrical signals which determine the timing and force to be inputted to secondary support structure 144. Processor 156 provides a lagging signal based on the output of sensors 158, 160 which monitor pendulum movement. Hence, when primary platform 32 shifts to one side such movement is sensed by one or more of sensors 158, 160 and a signal is sent to processor 156. The signal is then sensed at processor 156 and processor 156 outputs a signal to one or more of actuators 148, 150, 152 and 154 such that secondary support structure 144 is shifted in the same direction, only lagging somewhat in time. This lagging function causes damping.

Figure 13:
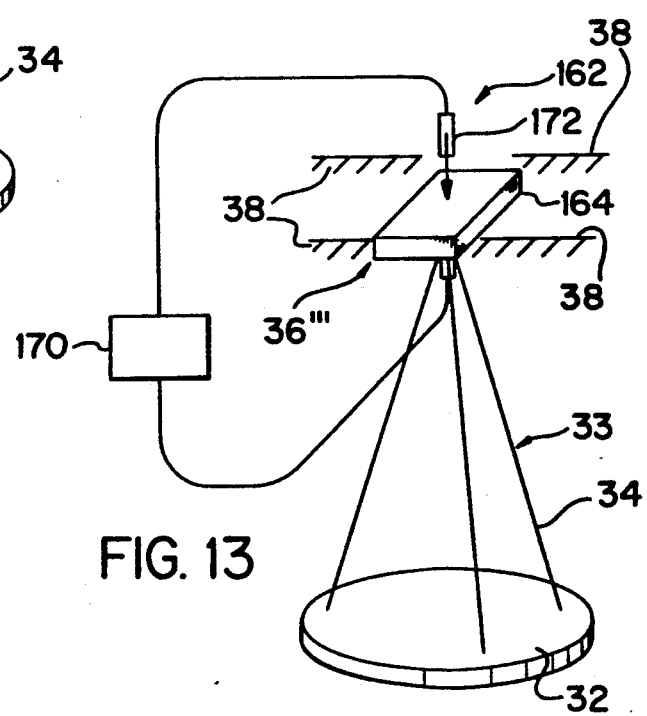
FIG. 13 shows in perspective the pendulous assembly of FIG. 1 together with an active vertical attenuation system.

FIG. 13 shows an additional embodiment of the present invention having primary platform 32 and suspension lines 34 extending from pivot means 36'''. Pivot means 36''' comprises an active vertical attenuation system 162 and a secondary support structure 164 which is connected to primary support structure 38. The connection between primary support structure 38 and secondary support structure 164 in FIG. 13 is such that a limited degree of pivotal movement of secondary support structure 164 is possible. Sensor 166 is an accelerometer to monitor the vertical movement of secondary support structure 164. Sensor 166 relays the acceleration of secondary support structure 164 to processor 170 which, in turn, directs vertical actuator 172 to expand or contract in opposition to the sensed acceleration. Thus, active vertical attenuation system 162 represents an active suspension system which helps to prevent forces which could cause bouncing of the platform from being transferred through the pivot means, suspension lines and to the platform 32.

Figure 14:
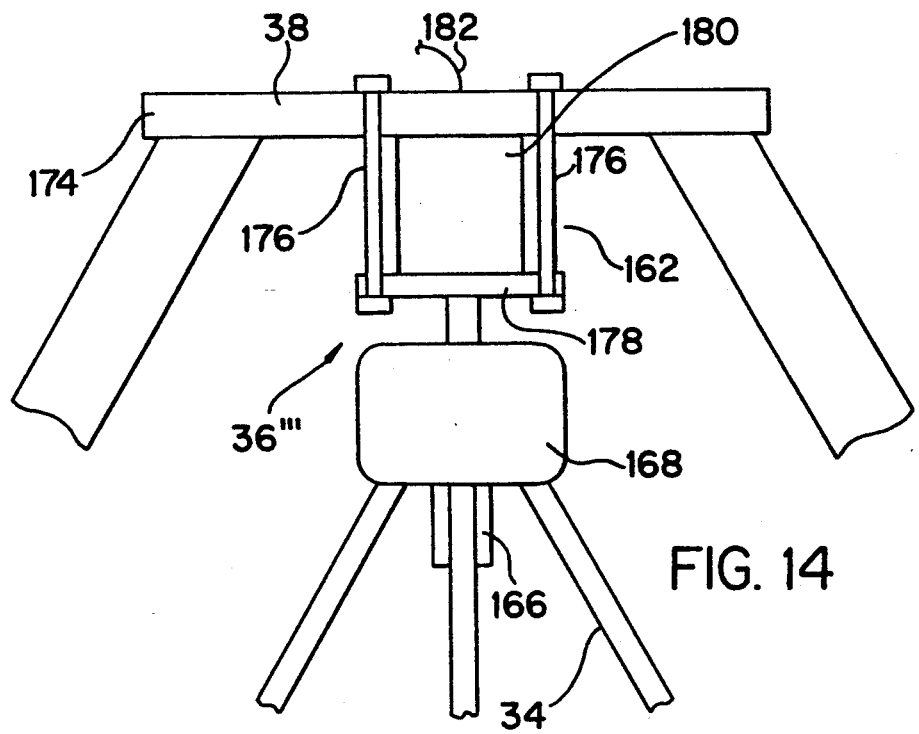
FIG. 14 shows in greater detail the active vertical attenuation system of FIG. 13.

FIG. 14 illustrates in greater detail active vertical attenuation system 162. As shown in FIG. 14, support structure 38 takes the form of the aforementioned tripod arrangement 104, except for a modified apex section. Support structure 38 includes a cross beam 174 through which a plurality of compression bolts 176 extend. Compression bolts 176 are connected at their lower end to plate 178. Positioned between the undersurface of beam 174 and plate 178 is piezoelectric drive member 180. Piezoelectric drive 180 expands and contracts in conjunction with the signals sent from microprocessor 170 through communication line 182. Thus, in accordance with the strength of the electrical signals sent from microprocessor 170, piezoelectric drive 180 expands or contracts so as to shift pivot means 36 in a vertical direction and in a manner which lags behind the vertical shifting of the pendulous platform 32. FIG. 14 also illustrates sensor 166 attached below 168 for sensing input vibration.

Figure 15:
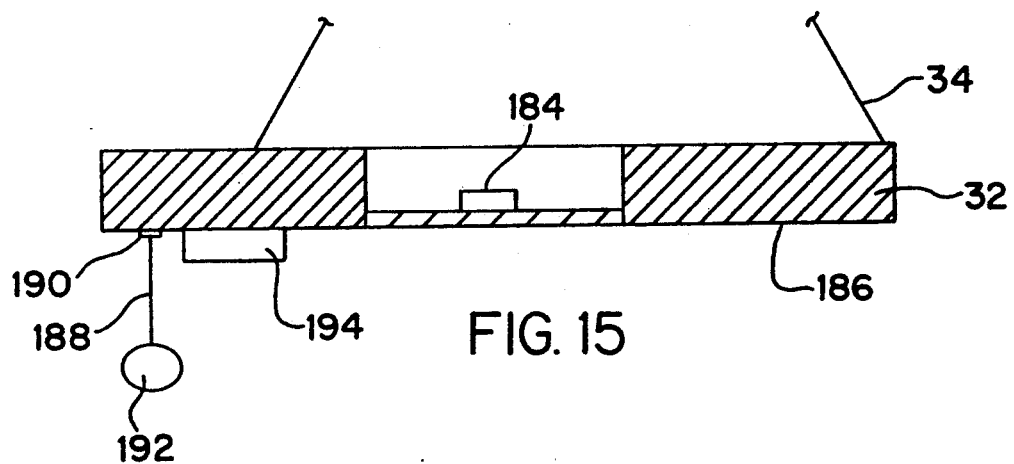
FIG. 15 shows a pendulous platform together with an undamped secondary pendulum drive.

FIG. 15 illustrates an alternate embodiment of the invention wherein a known gravitational value is inputted to primary platform 32. As shown, accelerometer 184 is retained within recess 140 formed in platform 32. Connected to the undersurface 186 of platform 32 is tether line 188. Tether line 188 is connected to the primary platform 32 at pivot connection means 190 which preferably allows relatively low stiction movement of tether line 188 with respect to platform 32. At the lower end of tether line 188 is secured mass 192. Pivot connection means 190, tether line 188 and mass 192 provide a means for undamped secondary pendulum drive. This undamped secondary pendulum drive allows for the input of a known frequency to primary platform 32 for the purposes of testing in accelerometer 184. The undamped secondary pendulum drive can be placed into motion manually. However, due to the possibility of inadvertent additional horizontal forces being applied in the manual movement of mass 192, it is preferably to rely upon linear drive motor 194 as means for placing mass 192 in a harmonic swinging motion.

Figure 16:
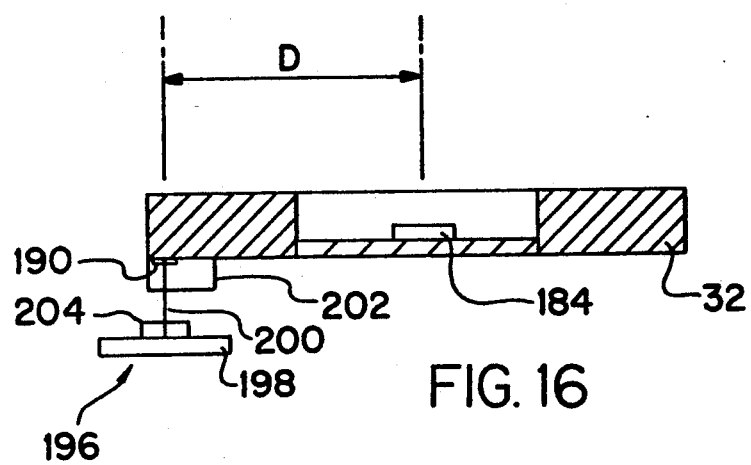
FIG. 16 shows in cross-section the primary pendulous platform having a damped secondary pendulum weight tray attached thereto.

FIG. 16 illustrates another embodiment which can be relied upon to incline primary platform 32 for accelerometer testing purposes. FIG. 16 illustrates a damped secondary pendulum weight tray 196 which features weight tray 198 extending from tether 200. Tether 200 is connected to the undersurface of platform 32 by way of pivot point connection means 190. Tether 200 extends through platform damping means 202 which acts to dampen the swinging movement of tether line 200. Platform damping means 202 preferably is in the form of a floor mounted container of viscous fluid such as glycerin. A rigidly mounted paddle 206 is attached to weight tray 198 and opposes the velocity of weight tray 198 resulting in damping. Otherwise, the free swinging weight tray generates acceleration noise. The damping secondary pendulum weight tray assembly 196 shown in FIG. 16 provides a fixed point (i.e., 190) through which the gravitational force of added weight 204 is transferred. Accordingly, since the weight or gravitational force of mass 204 is known, the distance from the center of percussion of platform 32 to the pivot point which is designated D in FIG. 16, is known, and it is known that the pivot point connection is along the sensitive axis of accelerometer 184 the mass moment can be calculated with precision. Therefore, accelerometer 184 can be easily calibrated or tested for potential problems by comparing the actual output reading of the acceleration to the calculated value. If H is the height of the pivot above the center of gravity of pendulous assembly 30, then the acceleration sensed by the accelerometer from an initial horizontal position is given by $$\frac{M_1 \times D}{M_2 \times H} = g \sin \Theta$$

with $M_1$ equal to the mass of added weight 204, $M_2$ equal to the mass of pendulous assembly 30, and $\theta$ representing the change in tilt of the platform.

Figure 17:
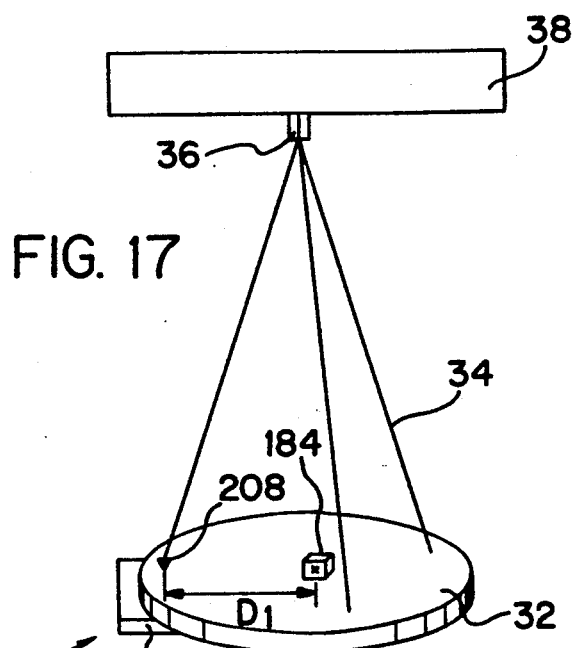
FIG. 17 shows in perspective the pendulous platform assembly of FIG. 1 together with a knife edge weight tray.

FIG. 17 illustrates yet another embodiment which includes a means for providing a known acceleration value to the platform. Another secondary pendulum means is contemplated as shown in FIG. 17 to be in the form of a knife edge weight tray assembly 206 which is positioned a known distance D1 from the center of percussion of primary platform 32. The use of knife edge 208 as the means for transmitting force to primary platform 32 ensures that the force will be transmitted to the platform at the predetermined distance D1. Thus, upon adding a known amount of mass to weight tray 210, the degree of incline of primary platform 32 and the amount of acceleration which should be sensed by accelerometer 184 can be determined with high precision.

Figure 18:
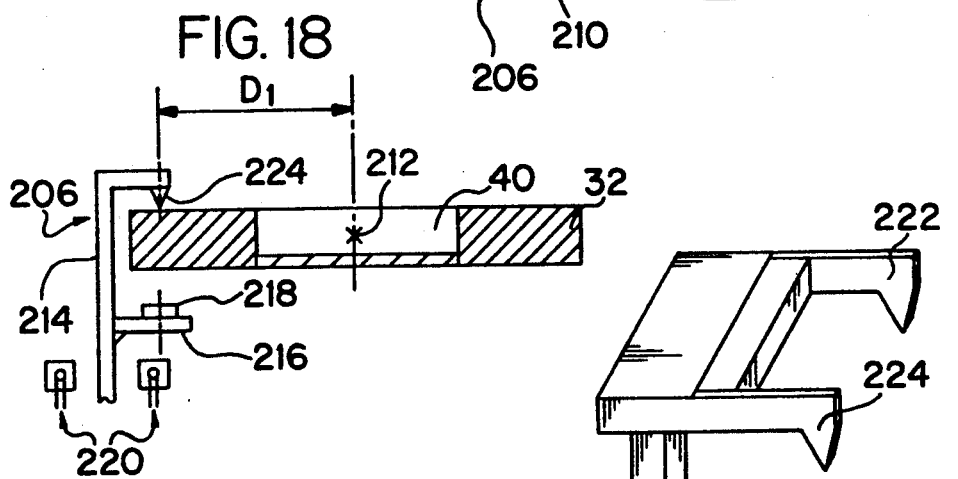
FIG. 18 shows a cross-section of a pendulous platform together with a driven knife edge weight tray.

FIG. 18 shows a cross-sectional view of primary platform 32 having recess 40 and a center of percussion designated 212. Knife edge weight tray assembly 206 shown in FIG. 18 features a vertical section 214 to which mass support plate 216 is secured for the purpose of providing a support for mass 218. The known mass 218 and length D1 allow for a known input to primary platform 32. With the removal of mass support 216 from its connection with vertical extension 214, it is possible to drive primary platform 32 through use of magnetic drive assembly 220. With this arrangement, vertical extension 214 acts as the permeable core between the two coils of magnetic drive assembly 220.

The magnetic drive may be attached to either the ground or the platform, with platform mounting being preferred.

Figure 19:
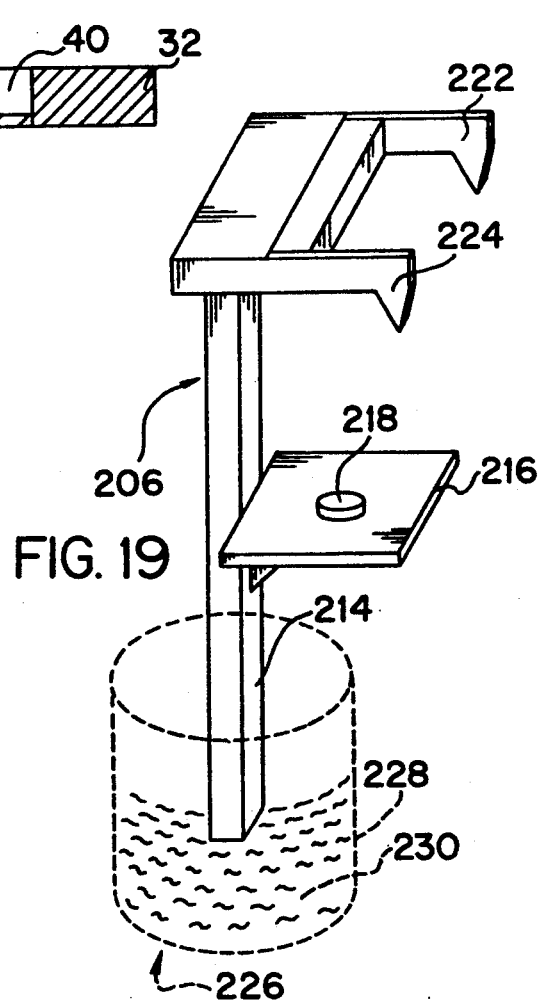
FIG. 19 shows in greater detail the knife edge weight tray of FIG. 18 as well as damping means for damping the movement of the weight tray.

FIG. 19 illustrates in greater detail knife edge weight tray assembly 206. In a preferred embodiment, a pair of knife edges 222 and 224 are utilized to achieve greater stability and to ensure that the mass swings along an axis having fixed minimal misalignment with the axis of the accelerometer being tested. "Dash pot" means 226 can also be provided to dampen the swinging motion of knife edge weight tray assembly 206. Dash pot 226 comprises a fluid container 228 partially filled with damping fluid 230 (e.g., motor oil or glycerol). Vertical extension 214 of knife edge weight tray assembly 206 extends down into damping fluid 230 such that knife edge weight tray assembly 206 can be damped by the fluid during the use of knife edge weight tray assembly 206 to input a known incline in primary platform 32.

Figure 20:
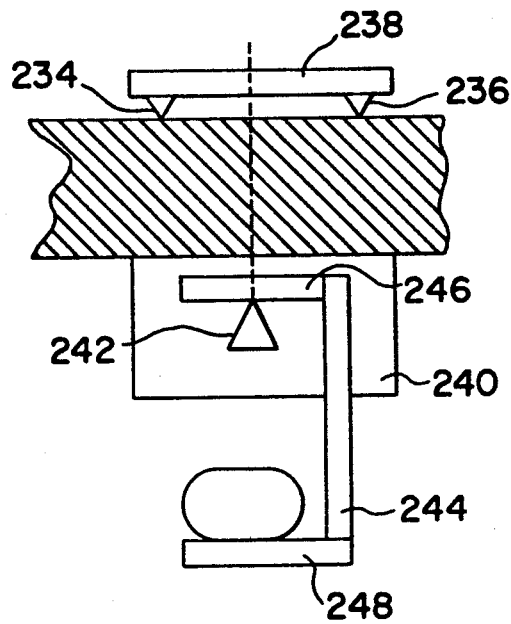
FIG. 20 shows a cross-sectional, cut-away view of the primary platform together with a dual stage knife edge weight tray.
Figure 21:
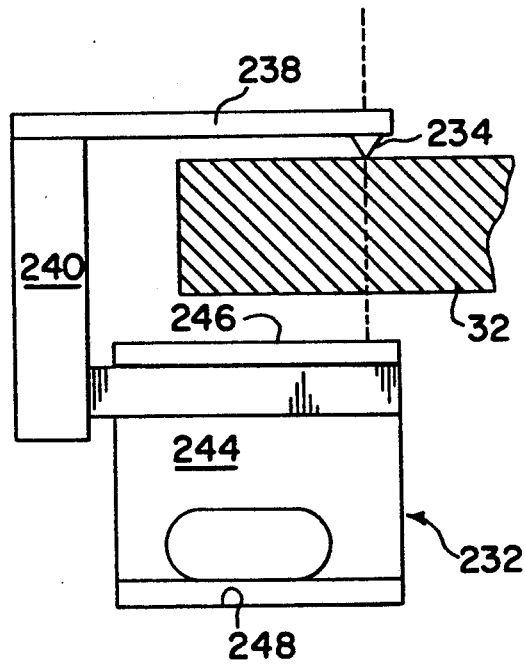
FIG. 21 shows in side view that which is shown in FIG. 20.

FIGS. 20 and 21 illustrate an even more preferred weight tray assembly which features a dual stage knife edge weight tray 232. Dual stage knife edge weight tray 232 features first and second knife edges 234 and 236 which extend from horizontal base section 238. Extending vertically off horizontal base section 238 is vertical section 240. Vertical section 240 ha horizontal knife edge bar 242 extending thereoff. A C-shaped weight tray 244 acts as a third pendulous member which includes an upper plate 246 supported on the horizontal knife edge bar 242. C-shaped weight tray 244 also includes a mass support plate 248 upon which mass 250 is inserted. Dual stage knife edge weight tray 232 provides the important function of ensuring that the force exerted downwardly between knife edges 234 and 236 is applied at a fixed point directly above knife edge bar 242. If the downward forces applied by knife edges 234 and 236 cause a lateral shift in the platform, an error proportioned to the cosine of the angle would be observed by the accelerometer under test.

Figure 22:
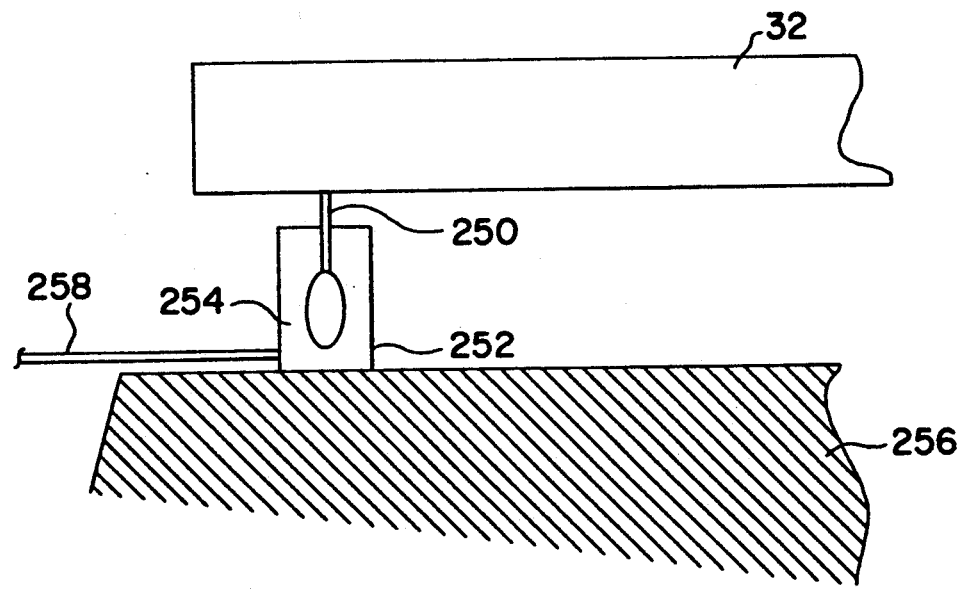
FIG. 22 shows a cross-sectional view of the primary platform together with a damping means utilizing damping fluid.

FIG. 22 illustrates means for damping the primary platform with a rigid paddle member 250 extending into a fluid container 252 which contains damping fluid 254. Fluid container 252 is mounted on underlying support 256 and the level of fluid within container 252 can be adjusted by way of fluid input/output conduit 258. These provide high initial platform damping following a disturbance and particularly provide damping of torsional oscillation of the primary platform with respect to the vertical axis of the pendulous assembly.

Figure 23:
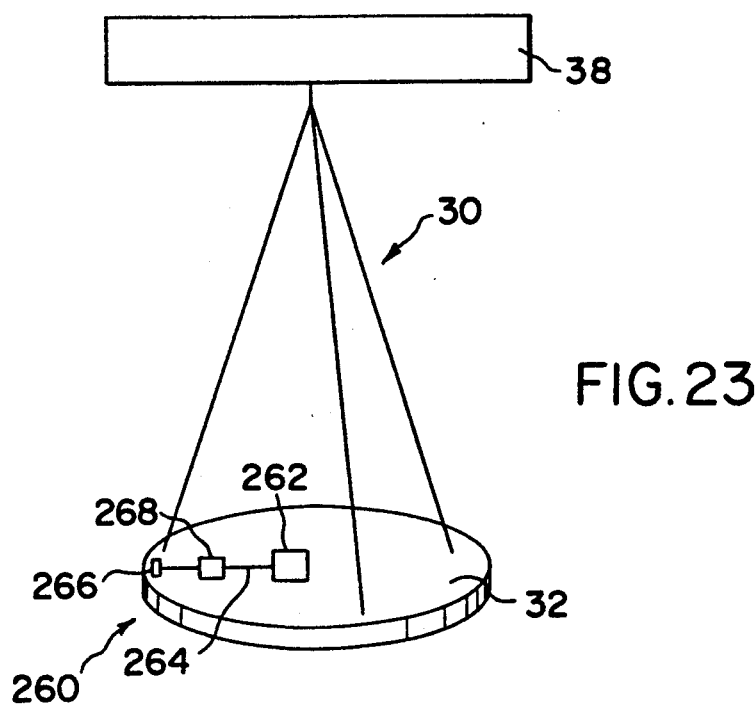
FIG. 23 shows a pendulous assembly like that of FIG. 1 together with a mass movement assembly.
Figure 24:
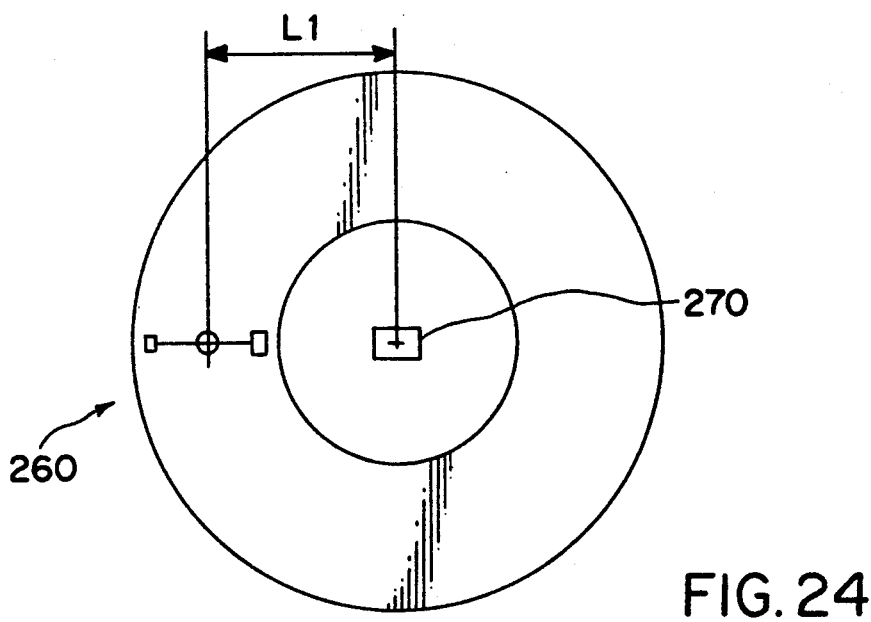
FIG. 24 shows in planar view a primary platform having a mass movement assembly positioned thereon.
Figure 25:
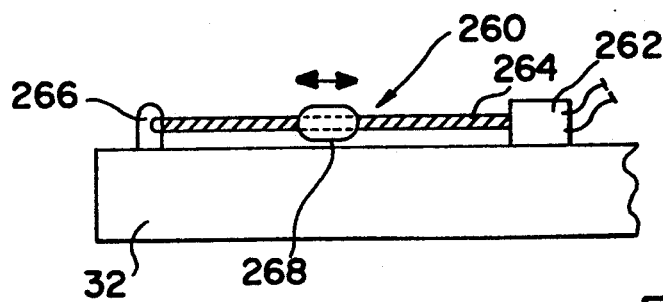
FIG. 25 shows in cut-away a more detailed illustration of the mass movement assembly.

FIGS. 23-25 illustrate an alternate embodiment of the present invention wherein rather than different masses being added to a weight tray at a known distance from the center of percussion, a known mass is varied in position with respect to the center of percussion of the platform. In other words, since the mass is known and the distance that the mass assumes from the center of percussion can be determined with high precision (e.g., with the help of a laser or optical scanner) the value of gravitational input can be calculated with high precision. FIG. 23 shows pendulous assembly 30 similar to that shown in FIG. 1 having mass movement assembly 260 which includes motor 262 which drives threaded member 264. Threaded member 264 is supported at its opposite end by screw support 266 and known mass 268 includes a central through-hole through which threaded member 264 extends. Accordingly, by rotating threaded member 264 known mass 268 can be positioned to varying positions along the length of threaded member 264. As shown in FIG. 24, threaded member 264 is axially aligned along the sensible axis of accelerometer 270.

Figure 26:
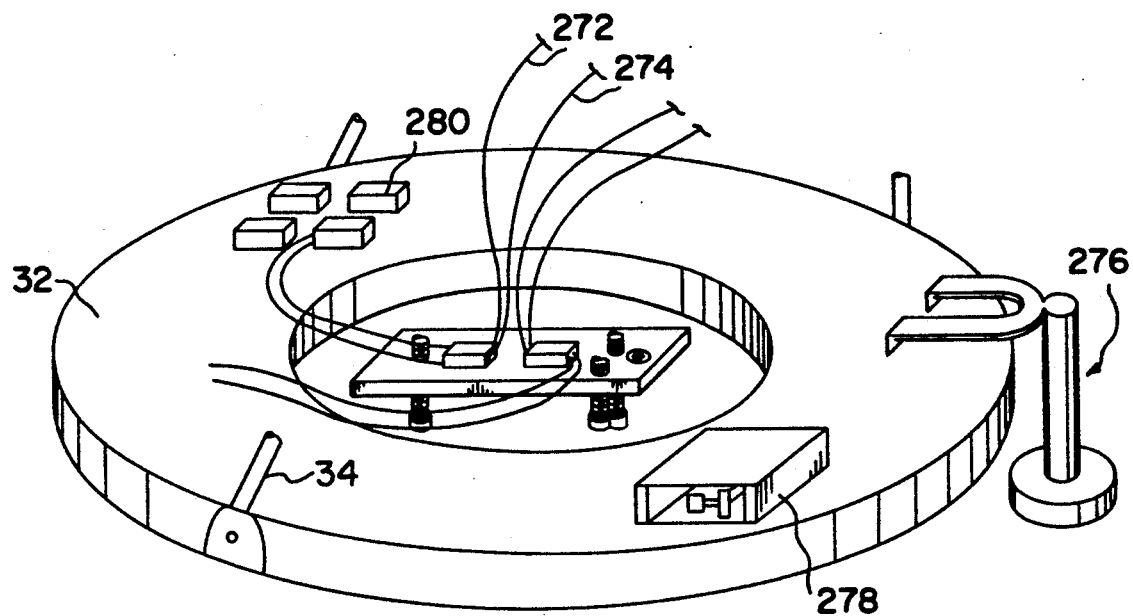
FIG. 26 shows a perspective view of the primary platform together with a calibration tray, input generator, batteries, and secondary platform.

FIG. 26 illustrates primary platform 32 as well as the positioning of various secondary components used in the testing of accelerometers 272 and 274 positioned on secondary platform 276. As shown, knife edge weight tray 276 can be used to input a known acceleration force to the accelerometers 272, 274 for the testing thereof. Additional, a fourier term input generator 278 can be mounted on the upper surface of primary platform 32 in diametrically offset fashion to batteries 280 so as not to alter the center of percussion of the platform assembly.

Figure 27:
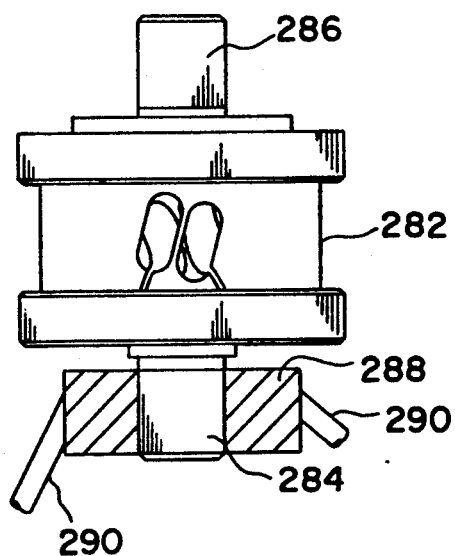
FIG. 27 shows a preferred embodiment of the pivot means.

FIG. 27 illustrates flexure member 282 which can be used as the pivot means for the pendulous assembly 30. Flexure member 282 includes an upper and lower threaded extension 284, 286. Connected to threaded extension 284 is adaptor 288 which can be a threaded ring to which suspension lines 290 are secured. Threaded extension 286 would be connected to either a primary support structure 38 or a secondary support structure such as that shown in FIG. 12. A flexure pivot such as that shown in FIG. 27 is sold by M.B. Electronics which is a division of Textron Electronics, Inc. of New Haven, Conn. and is designated by the brand "Mark X-Omniflex". The flexure pivot is described as having a 360 degree universal flexing with low restraining moment. In addition, the Omniflex flexure pivot is described as having a constant moment at load, non-hysteresis, high accuracy, and no change in restraint from side or torsion load.

In operation, accelerometer testing with the test fixture in accordance with the present invention preferably comprises investigating accelerometer stability, accelerometer linearity, and accelerometer response to repetitive vibration over selected frequencies. The accelerometers 50, 52 under test are placed upon the secondary platform 48 which is positioned at a desired position with respect to the center of percussion of the primary platform 32. Often, the accelerometers 50, 52 are placed at the center of percussion It is noted that one accelerometer can be tested, however, it is preferable to observe two or more accelerometers within the test fixture for each test phase. The use of a plurality of accelerometers allows consideration of thermal vibrations in air circulating about the accelerometer. Also, in the preferred manner of testing, the accelerometers 50, 52 are aligned along their common axis 58 so that they will have opposite polarity in response to tilt of the platform. After the accelerometers under test have been properly positioned on the primary platform 32, the platform is held quiet, in isolation from ambient vibrations. Depending upon the sensitivity desired, the pendulous assembly 30 of FIG. 1 alone can provide for vibration isolation within about 50 $\mu$g. Alternatively, if sensitivity within about 5 $\mu$g is required, the supporting tripod and suspension arrangements of FIGS. 9 and 10 can be used, and if accuracy within less than 1 $\mu$g is desired, then the arrangements comprising active damping mechanisms such as shown in FIGS. 12 and 13 would be used. Also, because the signal-generating elements of the accelerometers 50, 52 under test may be sensitive to temperature changes, the temperature in the test environment should be controlled to prevent variances in the DC or average output voltage from the accelerometers. During the stability test period, the accelerometers' DC output is monitored to detect drift. Each accelerometer will be regarded as stable if its DC output does not change or drift by more than an acceptable amount (e.g., $5 \times 10^{-8}$ g's/hr) over the duration of the test.

If the accelerometers 50, 52 under test are determined to be stable, they next are tested for calibration linearity. During the linearity investigation, the platform is tilted by a known angle using any of the secondary pendulum means shown in FIGS. 15 through 22, or the linear servo motor-mass mechanism of FIGS. 23 through 25. During the linearity investigation, the DC outputs of the accelerometers 50, 52 under test are monitored. The platform is further tilted by known angles to provide a tabulation of accelerometer average DC output against tilt angle. If the accelerometers under test exhibit linearity, they thus will be further tested for tolerance to vibration input.

In the preferred method, tilting of the platform is accomplished with either the arrangements of FIGS. 19 through 21 which comprise dual knife edges in contact with the upper side of the primary platform 32, or the linear motor and sensor arrangement of FIGS. 23 through 25. As for the arrangements of FIGS. 19 through 21, masses are then added or removed a known distance from the center of gravity of the platform 32. The arrangements shown in FIGS. 19 through 21 and 23 through 25 reduce hysteresis affects in the tilting of the platform. When the arrangement of FIGS. 23 through 25 is used, the motor and screw assembly continuously move the fixed mass 268 away from the pendulum center of mass to provide a rising ramp input which should be reflected by the average DC output of the accelerometers under test. An optical sensor such as a laser interferometer, or a like precision position measurement apparatus, indicates the position of the mass 268. Any hysteresis effects in the accelerometers under test can be measured by moving the fixed mass 268 back toward the primary platform center of mass according to a decreasing ramp input. Alternatively, where the secondary pendulum mechanism of Figures 19 through 21 are used, masses are added to the tray to tilt the primary platform 32. Increases in accelerometer DC output are recorded for each incremental increase in mass. In either case, as the platform tilt increases, the average DC output of each accelerometer under test should change by a proportional magnitude. Due to the directionality imparted to the accelerometers mounted along axis 58, the DC output of one should be seen to increase by approximately the same value as the other decreases.

Once linearity for the accelerometers 50, 52 under test has been established, their response to repetitive vibration is investigated. A low frequency (0.5 to 5 Hz) sinusoidal signal generated by the oscillatory motion of the secondary pendulum shown in FIGS. 15 through 21, by the sinusoidal input generator 74 or by the Fourier generator 74' is used to induce pendulous motion by the primary platform 32. As the platform is driven, average DC outputs and RMS outputs are monitored for the accelerometers 50, 52 under test. Their RMS outputs should increase depending upon the amplitude of the applied oscillatory signal. However, despite dramatic increases in RMS output there should be substantially no change in the average DC outputs of the accelerometers 50, 52. If the DC response has been changed by the oscillation of the primary platform 32, the accelerometers under test would be characterized as having rectification error. In a preferred procedure, these rectification error tests are performed at low frequencies of from about 0.04 to 1.4 Hz, and also at higher frequencies as high as 100 Hz. It is also preferred to halt the application of the controlled vibratory motion to the primary platform 32 so that the platform will stop oscillating. After the platform returns to its quiet state, the platform again is made to pendulously oscillate. This process is repeated as desired in order to obtain an average value of the average DC outputs of the accelerometers under test.

Although the present invention has been described with reference to preferred embodiments, the invention is not limited to the detailed thereof. Various substitutions and modifications will occur to those of ordinary skill in the art, and all such substitutions and modifications are intended to fall within the spirit and scope of the invention as defined in the appended claims. Further, while testing with the controlled acceleration platform has been described in connection with accelerometers as the devices under test, other instruments such as gyroscopic devices likewise could be tested therewith.

What is claimed is:

1. A method for testing a device on an acceleration platform assembly which comprises a pendulous assembly and pivot means for pivotably supporting said pendulous assembly, said pendulous assembly including a primary platform and suspending means for suspending said primary platform from said pivot means, said method comprising:

disposing a device under test at a known location with respect to the center of percussion of said pendulous assembly;

adjusting a secondary pendulous assembly, which is supported by said primary platform and is free to move relative to said primary platform, such that said secondary pendulous assembly causes said primary platform to move in response to the adjusting of said secondary pendulous assembly; and monitoring an output signal produced by the device under test to determine accuracy of the device under test.

2. A method for testing as claimed in claim 1 wherein the disposing of the test device includes positioning the test device at essentially the center of percussion of said pendulous assembly.

3. A method for testing as claimed in claim 1, wherein a plurality of output signals of the device under test are monitored, and said method further comprising taking an average of said plurality of output signals.

4. A method for testing as recited in claim 1 wherein the adjusting of said secondary pendulous assembly includes oscillating said secondary pendulous assembly with respect to said primary platform.

5. A method of testing as claimed in claim 4, wherein before said step of oscillating said secondary pendulous assembly, said method comprises the steps of:

(A) tilting the primary platform by a first predetermined angle;

(B) registering any change in the output signal of the test device in response to tilting of the primary platform;

(C) further tilting the primary platform by a second predetermined angle;

(D) registering any further change in the output signal in response to said further tilting; and (E) repeating steps (C) and (D) to determine calibration scale factor, linearity, and hysteresis of the device under test.

6. A method of testing as claimed in claim 4, wherein before said step of oscillating said secondary pendulous assembly, said method comprises the steps of:

(A) monitoring the output signal of the test device while the primary platform is substantially motionless to determine whether there is drift in a bias output signal of the test device;

(B) tilting the platform by a first predetermined angle;
(C) registering any change in the output signal in response to tilting of the platform;
(D) further tilting the platform by a second predetermined angle;
(E) registering any further change in the output signal in response to said further tilting; and
(F) repeating steps (D) and (E) to determine calibration scale factor, linearity, and hysteresis of the device under test.

7. A method for testing as recited in claim 1 wherein said secondary pendulous assembly includes a first tray and wherein the step of adjusting said secondary pendulous assembly includes providing an object of known mass on said first tray so as to lower the first tray and tilt the primary platform.

8. A method for testing as claimed in claim 7, wherein said step of providing an object on said first tray comprises suspending a third pendulous member which has a weight tray from said first tray.

9. A method for testing as claimed in claim 7 further comprising the step of positioning 1 mass on the weight tray of the third pendulous member.

10. A method as recited in claim 8 wherein the suspending of a third pendulous member includes placing said weight tray on a knife edge of an arm of said first tray such that said weight tray is arranged perpendicular to said knife edge.

11. A method for testing as recited in claim 7 further comprising placing said first tray in an oscillatory motion.

12. A method for testing as claimed in claim 1, wherein adjusting the secondary pendulous assembly includes placing said secondary pendulous assembly in an oscillatory motion, and said method for testing further comprising the steps of:
(A) halting the motion of the secondary pendulous assembly so as to halt motion in said primary platform;
(B) restarting the oscillatory motion of the secondary pendulous assembly and therefore the primary platform; and
(C) repeating steps (A) and (B) to obtain average values for the output signals.

13. A method for testing as claimed in claim 1, wherein said step of disposing the device under test comprises the step of:
fixing the height of a secondary platform positioned within a centrally located recess formed in said primary platform such that the device under test will be located at a predetermined region with respect to the center of percussion of the pendulous assembly.

14. A method for testing as claimed in claim 1, wherein before said step of adjusting said secondary pendulous assembly, said method comprises the way of:
monitoring output signals of the test device while the primary platform is substantially motionless to determine whether there is drift in said output signals.

15. A method for testing as claimed in claim 1 wherein said step of adjusting said secondary pendulous assembly includes adding a known mass to said secondary pendulous assembly so as to tilt said primary platform and monitoring any change in output in the test device due to the tilt in the primary platform.

16. A method for testing a device on an acceleration platform assembly which comprises a pendulous assembly and pivot means for pivotably supporting said pendulous assembly, said pendulous assembly including a primary platform with an upper surface suspending means for suspending said primary platform from said pivot means, said method comprising:
disposing a device under test at a known location with respect to the center of percussion of said pendulous assembly;
causing a movable member positioned on and supported by said primary platform to move relative to said primary platform in a reciprocal manner along an axis aligned with a sensitive axis of the device under test so as to cause said primary platform to move in response to movement of said movable member in a manner which is detected by the device under test and wherein said movable member is a secondary pendulous assembly which reciprocates in a pendulous fashion with respect to said primary platform; and
monitoring an output signal produced by the device under test to determine absence of error in the device under test.

17. A method for testing as claimed in claim 16 wherein the disposing of the test device includes positioning the test device at essentially the center of percussion of said pendulous assembly.

18. A method for testing as claimed in claim 16, wherein a plurality of output signals of the device under test are monitored, and some of said output signals include root mean square output signals and said method further comprising taking an average of at least some of said plurality of output signals.

19. A method of testing as claimed in claim 16, further comprising the steps of:
(A) halting movement of the movable member;
(B) restarting the movement of the movable member and therefore the primary platform; and
(C) repeating steps (A) and (B) to obtain average values for output signals of the test device.

20. A method for testing a device on an acceleration platform assembly which comprises a pendulous assembly and pivot means for pivotably supporting said pendulous assembly, said pendulous assembly including a primary platform with an upper surface and suspending means for suspending said primary platform from said pivot means, said method comprising:
disposing a device under test at a known location with respect to the center of percussion of said pendulous assembly;
causing a movable member positioned on and supported by said primary platform to move relative to said primary platform in a reciprocal manner along an axis aligned with a sensitive axis of the device under test so as to cause said primary platform to move in response to movement of said movable member in a manner which is detected by the device under test; and
monitoring an output signal produced by the device under test to determine absence of error in the device under test; and
wherein said step of disposing the device under test further comprises the steps of:
fixing the height of a secondary platform positioned within a recess formed in said primary platform so that the device under test will be located at a predetermined region with respect to the center of percussion of the primary platform.

21. A method for testing a device on an acceleration platform assembly which comprises a pendulous assembly and pivot means for pivotably supporting said pendulous assembly, said pendulous assembly including a primary platform with an upper surface and suspending means for suspending said primary platform from said pivot means, said method comprising:

disposing a device under test at a known location with respect to the center of percussion of said pendulous assembly;

causing a movable member positioned on and supported by said primary platform to move relative to said primary platform in a reciprocal manner along an axis aligned with a sensitive axis of the device under test so as to cause said primary platform to move in response to movement of said movable member in a manner which is detected by the device under test; and monitoring an output signal produced by the device under test to determine absence of error in the device under test, and wherein before said step of causing the primary platform to move, said method comprises the steps of:

(A) tilting the primary platform by a first predetermined angle;

(B) registering any change in the output signal of the test device in response to tilting of the primary platform;

(C) further tilting the primary platform by a second predetermined angle;

(D) registering any further change in the output signal in response to said further tilting; and (E) repeating steps (C) and (D) to determine calibration scale factor, linearity, and hysteresis of the device under test.

22. A method for testing a device on an acceleration platform assembly which comprises a pendulous assembly and pivot means for pivotably supporting said pendulous assembly, said pendulous assembly including a primary platform with an upper surface and suspending means for suspending said primary platform from said pivot means, said method comprising:

disposing a device under test at a known location with respect to the center of percussion of said pendulous assembly;

causing a movable member positioned on and supported by said primary platform to move relative to said primary platform in a reciprocal manner along an axis aligned with a sensitive axis of the device under test so as to cause said primary platform to move in response to movement of said movable member in a manner which is detected by the device under test; and monitoring an output signal produced by the device under test to determine absence of error in the device under test, and wherein before said step of causing the movable member to move, said method comprises the steps of:

(A) monitoring the output signal of the test device while the primary platform is substantially motionless to determine whether there is drift in the output signal of the device under test;

(B) tilting the primary platform by a first predetermined angle;

(C) registering any change in the output signal in response to tilting of the primary platform;

(D) further tilting the primary platform by a second predetermined angle;

(E) registering any further change in the output signal in response to said further tilting; and (F) repeating steps (D) and (E) to determine calibration scale factor, linearity, and hysteresis of said test device.

* * * * *